United States Patent [19]
Rutherford et al.

[11] 3,745,637
[45] July 17, 1973

[54] AXLE TOOLING

[75] Inventors: Robert C. Rutherford; John R. Loquai, both of Owatonna, Minn.

[73] Assignee: Owatonna Tool Company, Owatonna, Minn.

[22] Filed: Apr. 14, 1971

[21] Appl. No.: 133,781

[52] U.S. Cl.................... 29/261, 29/283, 254/133, 29/263
[51] Int. Cl............................................. B23p 19/04
[58] Field of Search..................... 29/244, 256, 257, 29/258, 259, 260, 261, 262, 263, 264, 265, 283; 254/133 R, 134; 33/174 R, 174 N, 174 S, 174 TB, 174 TC

[56] References Cited
UNITED STATES PATENTS

| | | | |
|---|---|---|---|
| 1,819,973 | 8/1931 | Richardson et al.................. | 29/260 |
| 2,205,311 | 6/1940 | Sabatello......................... | 33/174 N |
| 2,859,456 | 11/1958 | Taylor............................ | 29/244 |
| 3,337,943 | 8/1967 | Powell............................ | 29/261 |

Primary Examiner—Robert C. Riordon
Attorney—Hofgren, Wegner, Allen, Stellman & McCord

[57] ABSTRACT

An adaptor plate for use in removal and installation of ball joints from a knuckle and a tool kit including the same. The plate includes elongated, arcuate slots arcuately arranged in the form of a circle for adjustable receipt of threaded studs on a knuckle so that the plate may be secured to the knuckle. The plate is further provided with a pair of oppositely located slots so that when the plate is secured to the knuckle, one of the slots will be adjacent one ball joint on the knuckle and the other slot will be adjacent the other ball joint. As a result, the slots may receive the jaws of a pulling tool for both ball joint removal and insertion operations without requiring reorientation of the plate on a knuckle between the two operations. The tool kit includes the foregoing adaptor plate along with a puller and a threaded pressure applying member which may alternately receive a first head for driving ball joints from the knuckle, a second head having a cavity for pushing ball joints into the knuckle and an aligning nut for use in either of the operations.

6 Claims, 11 Drawing Figures

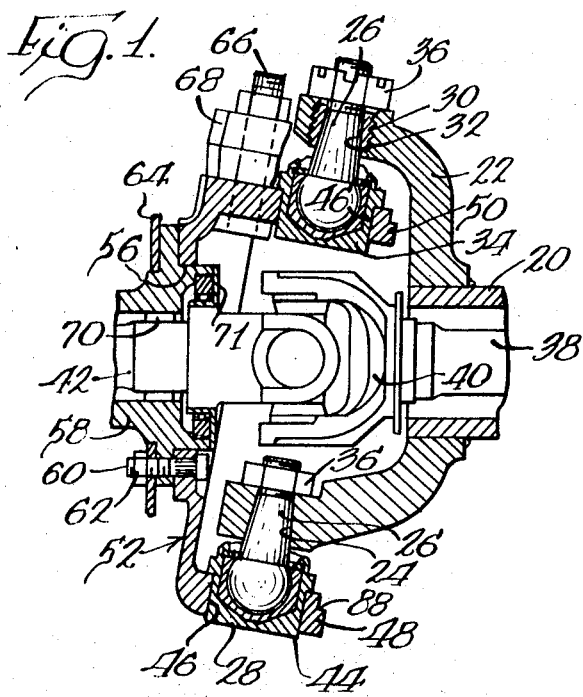

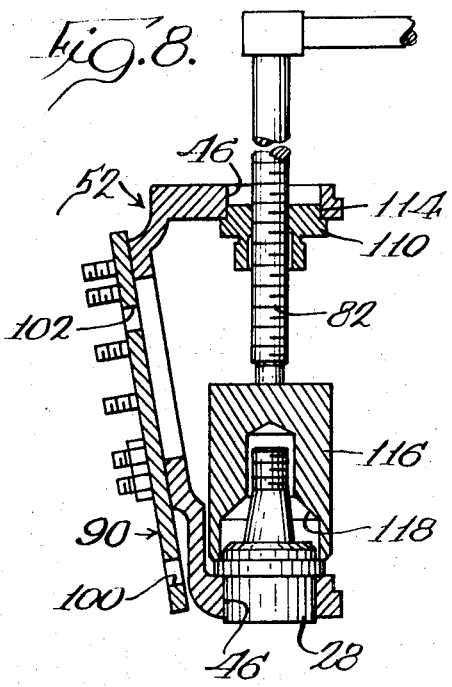
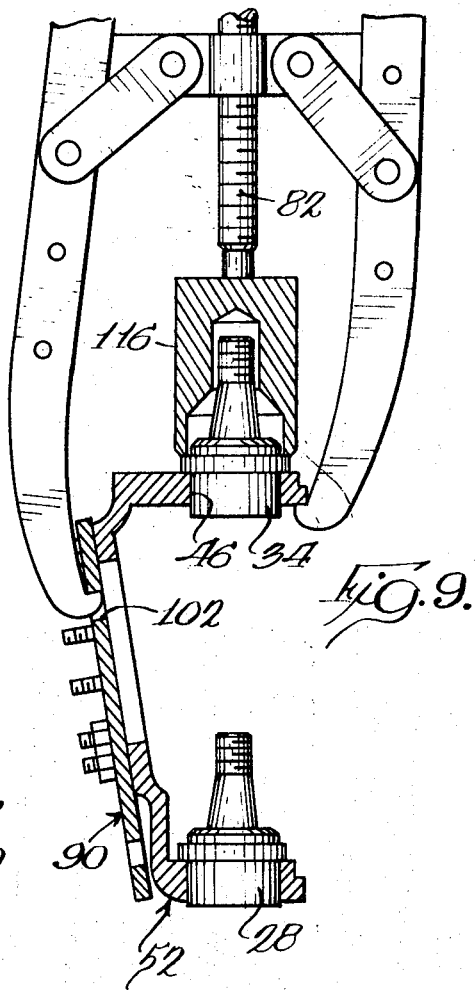
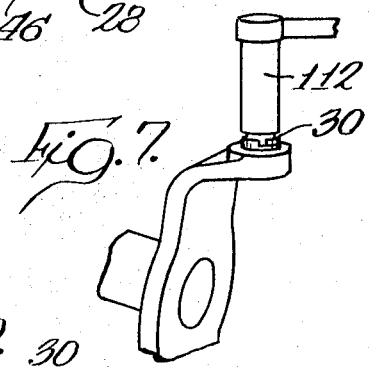
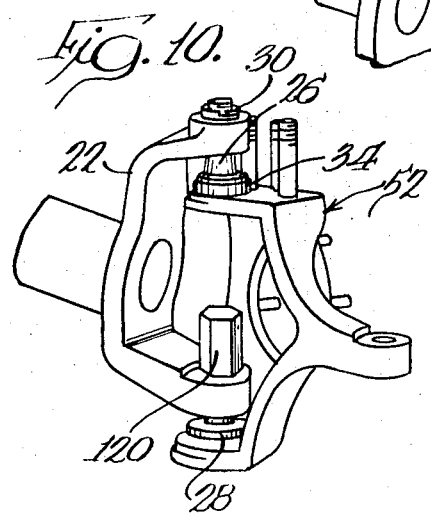
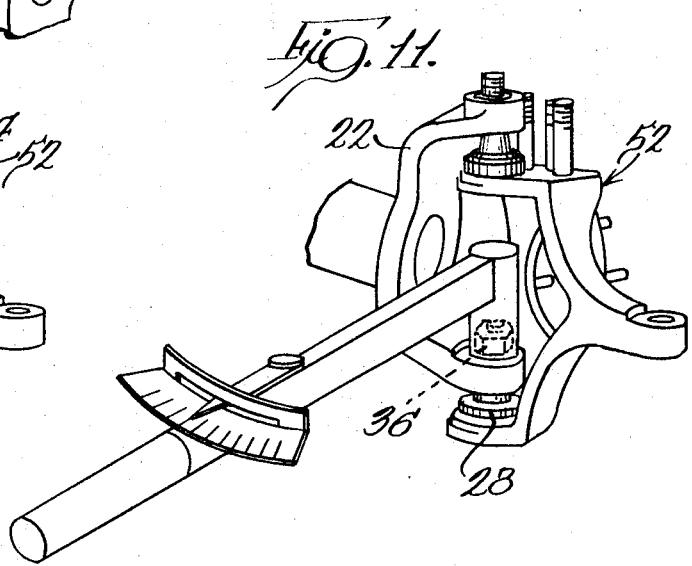

AXLE TOOLING

BACKGROUND OF THE INVENTION

This invention relates to tools, and more particularly, an adaptor plate for use in the assembly or disassembly of ball joints on knuckles and other analogous uses.

Many mechanisms are formed of two or more elements which are force fit together and require the use of pullers for disassembly and/or assembly. As is well-known, the pullers normally include at least two jaws which are employed to grip one part while a pressure applying member is moved relative thereto to force another part of the mechanism into or out of a corresponding opening in the first part. While such mechanisms cannot normally be regarded as delicate, care must be taken in locating the jaws on the part so as to preclude the formation of scores in bearing surfaces or the like.

It has therefore been proposed to provide adaptor plates which may be secured to one part and which may be provided with means for receiving one or more jaws of the puller during the assembly or disassembly operation. While such adaptor plates have been quite successful for their intended purpose, they have an outstanding drawback when the nature of the mechanism is such that the assembly and disassembly operation take place from opposite sides thereof. In such cases, it has heretofore been necessary to disassemble the adaptor plate from the mechanism following one operation and reassemble the same at a different location on the mechanism prior to the performance of the other operation.

SUMMARY OF THE INVENTION

It is the principal object of the invention to provide a new and improved adaptor plate that need not be reoriented on a part of a mechanism between the disassembly and reassembly operations of the mechanism where a pulling tool is required in each.

The exemplary embodiment of the invention achieves the foregoing object in a construction specifically intended for use in removing ball joints from a knuckle wherein the adaptor plate has a periphery in the form of a partial circle terminating in a trapezoidal configuration with its short base extending well beyond the periphery of the partial circle if extended. A plurality of arcuate, elongated slots are arcuately arranged within the circle portion and are adapted to receive threaded studs on a knuckle so that the plate may be secured thereto by nuts threaded on the studs. Elongated, generally parallel slots, each adapted to receive a jaw of a puller, are provided in the plate. According to one embodiment, one is located just inside the ring of arcuate slots opposite the trapezoidal projection while the other is located adjacent the short base of the trapezoidal projection.

The arrangement is such that the latter may be used in conjunction with the pulling tool in removing ball joints from the knuckle while the former may be used in conjunction with a pulling tool for inserting ball joints in the knuckle.

The invention also contemplates a tool kit for use in changing ball joints including the adaptor plate mentioned above. In particular, the tool kit includes a gripper having at least two jaws with an element interconnecting the two jaws. A threaded, pressure applying member is threadedly received in the interconnecting element and is provided with a first head for driving ball joints from a ball joint receiving opening in the knuckle and a second head having a cavity adapted to fit over a portion of the ball joint to apply pressure thereto to insert ball joints into the knuckle. Additionally, the threaded pressure applying member is removable from the puller and the kit further includes a so-called speed nut having a portion of greater peripheral extent than a ball joint receiving opening in the knuckle with which it is to be used to embrace the knuckle adjacent the same, along with a surface that may be snugly received within the ball joint receiving opening for alignment purposes. The purpose of this structure is to provide an alternate means for inserting or removing ball joints from a knuckle and partcicularly, for use in removing or inserting that ball joint on a knuckle that is most remotely located from the point of manipulation of the pressure applying member.

Other objects and advantages will become apparent from the following specification taken in conjunction with the accompanying drawings.

DESCRIPTION OF THE DRAWINGS

FIG. 1 is a vertical section of a knuckle, yoke and ball joint assembly with which the invention is intended to be used;

FIG. 2 is a fragmentary side elevation of the partially disassembled knuckle-yoke-ball joint construction having an adaptor plate made according to the invention secured thereto;

FIG. 3 is a perspective view of the assemblage illustrated in FIG. 2 with a puller applied thereto for the purpose of disassembling the knuckle and the yoke and removing one of the ball joints;

FIG. 4 is a vertical section taken approximately along the line 4—4 of FIG. 3;

FIG. 5 is a perspective view of the knuckle with the puller assembled thereon for removing the upper ball joint therefrom;

FIG. 6 is a perspective view of the yoke with the puller assembled thereon for removing a ball joint from the yoke;

FIG. 7 is a perspective view that illustrates the removal of an adjusting sleeve from the yoke;

FIG. 8 illustrates the insertion of a new, lower ball joint into the knuckle;

FIG. 9 illustrates the insertion of a new, upper ball joint into the knuckle;

FIG. 10 is a perspective view illustrating one step in the reassembly process; and FIG. 11 illustrates a step in the reassembly process subsequent to the step illustrated in FIG. 10.

DESCRIPTION OF THE PREFERRED EMBODIMENTS

A typical mechanism with which the adaptor plate and tool kit of the invention is intended to be used for assembly and disassembly purposes is illustrated in FIG. 1 and is seen to comprise an axle joint assembly of the type used for the front wheels of four-wheel drive vehicles. The same includes an axle housing 20 terminating in one end with a yoke 22. One end of the yoke includes a tapered bore 24 for receipt of a mating tapered stud shaft 26 of a conventional ball joint assembly 28 while the other end of the yoke is threaded to receive an adjusting nut 30 having a tapered internal bore 32 for receiving the tapered stub shaft 26 of an upper ball joint 34. Both of the stub shafts 26 terminate in threaded ends receiving nuts 36 to secure the ball joints 28 and 34 to the yoke 22.

The housing 20 has a drive axle 38 extending therethrough from the front differential (not shown) to a conventional universal joint 40 which in turn is connected to the front wheel axle shaft 42.

The upper and lower ball joints 28 and 34 are identical and each includes a cap 44 force fit in a bore 46 in opposite arms 48 and 50 of a knuckle generally designated 52. The knuckle 52 also includes an opening 56 through which the axle shaft 42 passes and which receives one end of a spindle 58. Threaded studs 60 are circumferentially spaced about the opening 56 and pressed into the knuckle and passed through mating bores in the spindle 58 to nuts 62. Interposed between the spindle 58 and the nuts 62 is a backing plate 64 as is well-known. The assemblage is completed by a generally upstanding shaft 66 for connection to a tie rod 68 and by needle roller bearings 70 within the spindle 58 and confronting the axle shaft 42. Additionally, an oil seal 71 is provided.

When it becomes necessary to replace the ball joints 28 and 34, the nuts 62 are removed so that the backing plate 64 and spindle 58 may be taken off of the assembly. The shafts 38 and 42 along with the universal joint 40 may then be removed in a customary manner through the opening 56 in the knuckle. Because the ball joints 28 and 34 are force fit within their respective openings 46, they must be forced out of those openings with the use of a puller such as that illustrated in FIG. 3 and generally designated 72. While the tool 72 is designated a "puller" herein and indeed is employed to pull the knuckle 52 off of one of the ball joints, it is to be understood that the term also encompasses the use of such tool for pushing ball joints into or out of the knuckle.

As best seen in FIGS. 3 and 4, the puller 72 includes two jaw elements 74 and 76 which are spanned by an element 78 having a threaded bore 80 receiving a threaded pressure applying member or screw 82. Links 84 flexibly interconnect jaws 74 and 76 to the element 78 for the purpose of controlling the maximum spacing of the jaws 74 and 76 as well as their relative alignment. With reference to FIG. 4, each of the jaws 74 and 76 terminates in an inturned tooth 86 which is used to grip the mechanism on which the puller is to be used so that upon rotation of the screw 82 relative movement will take place which may be harnessed to cause removal of the ball joints 28 and 34.

With reference to FIGS. 1 and 4, the casting comprising the knuckle 52 is provided with a small notch 88 for receiving the tooth 86 on the jaw 74. However, there is no similar provision for the tooth 86 and the jaw 76 and while the jaw 76 could be adjustably oriented in such a way that the tooth 86 could be hooked over an edge of the opening 56, it is undersirable that such be done inasmuch as the spindle 58 includes an end which snugly fits within the opening 56 as illustrated in FIG. 1. Therefore, in order to avoid damaging the mechanism, an adaptor plate, generally designated 90, is employed. As best seen in FIG. 2, the adaptor plate 90 has a periphery defined as a partial circle 92 which terminates in a trapezoidal projection 94 having a short base 96. Within a continuation of the partial circle portion 92 there are located six, arcuate, elongated slots 98 disposed in a circular configuration and each adapted to receive the threaded studs 60 projecting outwardly from the knuckle 52. The nut 62 may then be located on the studs 60 to hold the adaptor plate 90 in place. The purpose of the elongation of the slots 98 is to permit angular adjustment of the adaptor plate 90 on the knuckle so that puller jaw receiving apertures may be aligned exactly transverse to the direction in which force is to be applied to the ball joints either during removal or insertion.

The plate 90 also includes elongated, opposed, parallel slots 100 and 102 with the slot 100 being located adjacent the short base 96 of the trapezoidal projection 94 and the slot 102 being within the circle defined by the slots 98 and adjacent the end of the plate 90 opposite the short base 96 of the trapezoidal projection 94. As a result, the slot 100 is near the lower ball joint 28 while the slot 102 is adjacent the upper ball joint 34.

Returning to FIG. 3, the jaws 74 and 76 may be assembled to the structure including the adaptor plate 90 as illustrated and the screw 82 rotated to advance the same toward the lower ball joint 28. Rotation of the screw 82 may be accomplished by any suitable crank as, for example, the ratchet tool 104 illustrated.

As seen in FIG. 4, the pressure applying end 106 of the screw 82 may nest in a small opening (not shown) in a head 108 abutting the cap 44 of the lower ball joint 28. As the screw 82 is rotated to advance the same, pressure applied thereby to the head 108, which has a diameter less than the diameter of the opening 46 in which the ball joint 28 is received, will cause the ball joint 28 to be forcefully pushed out of the opening 46. The same movement will cause the yoke 22 to be moved upwardly which will result in the upper ball joint 34 being pulled out of its associated opening 46 or the yoke separating from the upper ball joint 34. The yoke 22 may then be removed along with the lower ball joint 28. If the screw 82 is of sufficient length, or if the same is provided with an extension, continued rotation of the screw 82 will cause the head 108 to contact the upper ball joint 34 and the same may then be pushed out of its associated opening 46 in the manner just described. Alternately, the procedure illustrated in FIG. 5 may be followed. According to this procedure, the screw 82 is disassembled from the puller 72 and a speed nut 110 impaled thereon. The speed nut 110 has a greater peripheral extent than the opening 46 in the knuckle and may bear against the lower arm 48 of the same so that the screw 82 will move upwardly when rotated. During such movement, the head 108 will abut the lower end of the upper ball joint 34, forcing the same out of the knuckle.

If the upper ball joint 34 does not remain in the knuckle during removal of the lower ball joint 28 therefrom, but rather, remains in the yoke 22, the same may be knocked out of the yoke 22 by means of a rawhide hammer or the like.

The lower ball joint 28 may be removed from the yoke in the manner illustrated in FIG. 6. Specifically, the screw 82 already removed from the puller assembly 72 and fitted with the internally threaded "speed nut" 110 is employed. The speed nut 110 has a greater peripheral extent than the opening in the yoke 22 and may bear against the upper arm of the same to cause the screw 82 to move downwardly when rotated. During such movement, the head 108 will abut the upper end of the stub shaft 26 of the lower ball joint forcing the same out of the yoke.

At this point in the operation, both ball joints have been removed from both knuckles and the yoke. Using a spanner wrench 112, the adjusting nut 30 may be removed as illustrated in FIG. 7.

Turning now to FIG. 8, the installation of a new lower ball joint in the knuckle is illustrated. In particular, the speed nut 110 is illustrated and is seen to further include a generally cylindrical surface 114 which is snugly received in the upper opening 46 of the knuckle and is associated with the screw 82 in the manner mentioned previously. However, the head 108 has been replaced with an inserting head 116 having a central cavity 118 that approximately mates with the external surface of the stub shaft end of the lower ball joint 28. Rotation of the screw 82 in the manner mentioned previously will force the lower ball joint 28 into the position illustrated in FIG. 8.

FIG. 9 illustrates the means by which the upper ball joint 34 is assembled into its associated opening 46. At this time, the speed nut 110 is removed from the screw 82 and the latter replaced in the puller. The assembly tube 116 is still employed and using the opening 102 in the adaptor plate 90, the screw 82 is rotated to firmly seat the upper ball joint 34 as illustrated.

The next step in reassembly is to place the yoke 22 on the stub shafts 26 as illustrated in FIG. 10. Once the same has been done, an installation nut 120 may be hand-tightened on the stub shaft of the lower ball joint 28 to hold the assemblage together. At this point, a new adjustment nut 30 may be inserted using the spanner wrench and the appropriate adjustment made. Thereafter, the installation nut 120 may be removed and one of the nuts 36 substituted therefor.

It is to be noted that the installation nut 120 is preferably of a length as to project into the path of the axle so that complete installation cannot take place without the installer substituting one of the nuts 36 for the nut 120.

Thereafter, as illustrated in FIG. 11, the nut 36 associated with the lower ball joint 28 is torqued to a desired setting whereupon a nut 36 may be placed on the upper ball joint stub shaft 26 and appropriately torqued. The axles may then be reapplied to the device as well as the spindle, etc., in a manner opposite that of the steps of removal.

From the foregoing, it will be seen that the adaptor plate of the invention as well as its tool kit minimize the number of manipulations required in performing an operation of the type mentioned. In particular, there is no need to reorient the plate between the ball joint pulling and the ball joint insertion operations as the plate 90 includes both of the slots 100 and 102 which are used respectively in the two operations.

We claim:

1. An adaptor plate for use with a pulling tool in pulling opposed ball joints from a knuckle comprising: a plate having at least two arcuately arranged slots therein for adjustable receipt of threaded studs on a knuckle whereby the plate may be secured to the knuckle; and a pair of substantially straight, parallel slots at opposed locations in said plate and oriented with respect to said arcuately arranged slots so that when said plate is secured to said knuckle, one of said opposed slots will be adjacent one ball joint in the knuckle and the other of the opposed slots will be adjacent the other ball joint on the knuckle whereby one of said slots may receive a jaw of a pulling tool during the removal of at least one ball joint from said knuckle and the other of said opposed slots may receive a jaw of the pulling tool during insertion of at least one new ball joint in said knuckle without requiring reorientation of said plate on said knuckle between the removal and insertion of ball joints.

2. The adaptor plate of claim 1 wherein said arcuately arranged slots are located on said plate in such a way as to define a circle having a diameter greater than the diameter of an opening in the knuckle with which the plate is to be used, and one of said opposed slots is within said circle and the other of said opposed slots is outside of said circle.

3. The adaptor grip plate of claim 2 wherein said arcuately arranged slots are elongated and arcuate about the center of said circle.

4. The adaptor plate of claim 3 wherein the plate periphery is defined by a partial circle terminating in a trapezoidal configuration having its short base located well beyond the periphery of said circle and including the one of said opposed slots outside of said circle therein.

5. A tool set for use in removing and inserting ball joints from a knuckle comprising: an adaptor plate having a series of elongated, arcuately arranged slots therein for receiving threaded studs on a knuckle whereby the same may be attached to a knuckle, said plate further including a pair of opposed, generally parallel slots each adapted to receive a jaw of a puller, one of said slots receiving said jaw during removal of ball joints from the knuckle, the other of said slots receiving said jaw during insertion of ball joints into the knuckle; a puller having at least two jaws and a threaded pressure applying member received in a threaded bore in an element interconnecting said jaws, said pressure applying member including a pressure applying end; a first head for said end and configured to pass through a ball joint receiving opening in the knuckle for use with said puller in removing ball joints from the knuckle and a second head for said end including a cavity for partially receiving a ball joint to engage the same to insert a ball joint into a ball joint receiving opening in said knuckle.

6. The tool kit of claim 5 wherein said threaded pressure applying member is detachable from said puller and further including a threaded element having a greater peripheral extent than a ball joint receiving opening in said knuckle and adapted to be threadedly received on said pressure applying member, said last named element further including a surface adapted to be snugly received in a ball joint receiving opening in said knuckle.

* * * * *